United States Patent
Collins et al.

(10) Patent No.: US 10,042,361 B2
(45) Date of Patent: Aug. 7, 2018

(54) SYSTEM AND METHOD FOR TERRESTRIAL VEHICLE NAVIGATION

(71) Applicant: BEIJING UNISTRONG SCIENCE & TECHNOLOGY CO., LTD., Beijing (CN)

(72) Inventors: Dennis M. Collins, Overgaard, AZ (US); John A. McClure, Scottsdale, AZ (US)

(73) Assignee: Beijing Unistrong Science & Technology Co., Ltd., Beijing (CN)

( * ) Notice: Subject to any disclaimer, the term of this patent is extended or adjusted under 35 U.S.C. 154(b) by 0 days.

(21) Appl. No.: 15/527,393

(22) PCT Filed: Dec. 7, 2015

(86) PCT No.: PCT/CN2015/096513
§ 371 (c)(1),
(2) Date: May 17, 2017

(87) PCT Pub. No.: WO2017/096500
PCT Pub. Date: Jun. 15, 2017

(65) Prior Publication Data
US 2017/0364078 A1    Dec. 21, 2017

(51) Int. Cl.
*G05D 1/02* (2006.01)
*G01C 21/16* (2006.01)
(Continued)

(52) U.S. Cl.
CPC ......... *G05D 1/0212* (2013.01); *G01C 21/165* (2013.01); *G01C 21/18* (2013.01);
(Continued)

(58) Field of Classification Search
CPC .... G05D 1/0212; G05D 1/027; G05D 1/0278; G05D 2201/0201; G01C 21/165; G01C 21/18; G01S 19/49; A01B 69/004
See application file for complete search history.

(56) References Cited

U.S. PATENT DOCUMENTS 6,539,303 B2    3/2003  McClure et al.
6,694,260 B1 *  2/2004  Rekow ............... G01C 21/165
                                                      280/5.5
(Continued)

FOREIGN PATENT DOCUMENTS

CN          1550758 A       12/2004
CN        103080860 A        5/2013

OTHER PUBLICATIONS

PCT International Search Report and Written Opinion dated Sep. 6, 2016 for PCT International Application No. PCT/CN2015/096513, 12 pages.

*Primary Examiner* — Aaron L Troost
(74) *Attorney, Agent, or Firm* — RMCK Law Group, PLC

(57) ABSTRACT

A method for guiding a terrestrial vehicle along a desired path can include receiving a position signal from a global navigation satellite system (GNSS) antenna and a gyro signal from a gyro sensor that is indicative of: (i) at least one of a pitch and a roll of the terrestrial vehicle, and (ii) a gyro-based heading direction. A position of a point of interest of the terrestrial vehicle at a location different than the GNSS antenna can be determined based on the position signal, the gyro signal, and a positional relationship between the first location and the second location. A position-based heading direction of the point of interest of the terrestrial vehicle can be determined based on the determined position of the point of interest and at least one previously determined position of the point of interest.

20 Claims, 5 Drawing Sheets

(51) Int. Cl.
  *G01C 21/18* (2006.01)
  *G01S 19/49* (2010.01)
  *A01B 69/00* (2006.01)

(52) U.S. Cl.
  CPC .............. *G01S 19/49* (2013.01); *G05D 1/027* (2013.01); *G05D 1/0278* (2013.01); *A01B 69/004* (2013.01); *G05D 2201/0201* (2013.01)

(56) References Cited

U.S. PATENT DOCUMENTS

| | | |
|---|---|---|
| 6,711,501 B2 | 3/2004 | McClure et al. |
| 6,789,014 B1 | 9/2004 | Rekow et al. |
| 7,142,956 B2 | 11/2006 | Heiniger et al. |
| 7,400,956 B1 | 7/2008 | Feller et al. |
| 7,437,230 B2 | 10/2008 | McClure et al. |
| 7,885,745 B2 | 2/2011 | McClure et al. |
| 8,214,111 B2 | 7/2012 | Heiniger et al. |
| 2008/0086249 A1 | 4/2008 | Lange |
| 2008/0269988 A1 | 10/2008 | Feller et al. |
| 2009/0099730 A1 | 4/2009 | McClure et al. |
| 2009/0326763 A1 | 12/2009 | Rekow |
| 2010/0324772 A1 | 12/2010 | Aral et al. |
| 2011/0054729 A1 | 3/2011 | Whitehead et al. |
| 2013/0304300 A1 | 11/2013 | Peake et al. |
| 2014/0324291 A1* | 10/2014 | Jones .................. A01B 69/007 701/41 |
| 2015/0239500 A1 | 8/2015 | Green et al. |

* cited by examiner

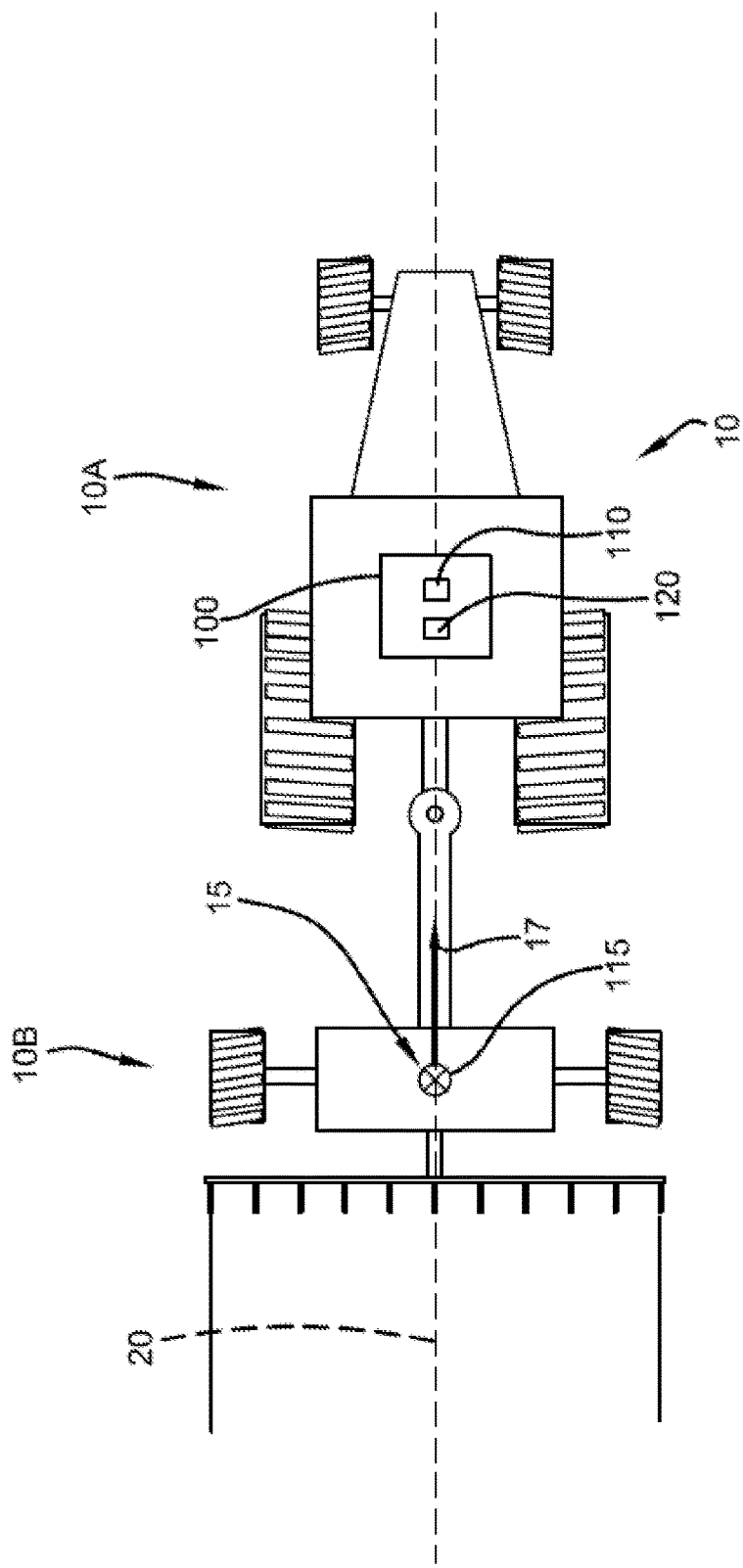

SYSTEM AND METHOD FOR TERRESTRIAL VEHICLE NAVIGATION

CROSS-REFERENCE TO RELATED APPLICATIONS

This application is a 371 U.S. National Stage of International Application No. PCT/CN2015/096513, filed Dec. 7, 2015, the disclosure of which is incorporated herein by reference in its entirety.

FIELD

The present disclosure relates to navigation systems and methods, and more particularly to systems and methods for high precision navigation of a terrestrial vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some industries, such as the agricultural and mining industries, it may be desirable to provide accurate navigational guidance for terrestrial vehicles. For example only, a tractor or other agricultural vehicle may be plowing, tilling, planting, harvesting, or otherwise working in a field. In order to provide complete coverage of the field in the most efficient manner, the vehicle may utilize a navigation system that assists with guiding the vehicle along a desired path. In yet another example, a mining vehicle may wish to travel along a desired path through and/or to and from a mining location and utilize a navigation system to do so. Such navigation systems may utilize a global navigation satellite system ("GNSS") or similar system to assist with the location and guidance services. A GNSS is a system of satellites that provide geo-spatial positioning for a receiver or group of receivers.

Current navigation systems and methods for terrestrial vehicles (tractors, mining vehicles, etc.) may suffer from a number of limitations that affect the accuracy or other performance of the guidance. There remains a need for an improved navigation system for terrestrial vehicles.

SUMMARY

According to various aspects of the present disclosure, a method for guiding a terrestrial vehicle along a desired path is disclosed. The method can include receiving a position signal from a global navigation satellite system (GNSS) antenna mounted at a first location on the terrestrial vehicle. The position signal can be indicative of a spatial position of the GNSS antenna as indicated by the GNSS. The method can further include receiving a gyro signal from a gyro sensor that is indicative of: (i) at least one of a pitch and a roll of the terrestrial vehicle, and (ii) a gyro-based heading direction. Additionally, the method can include determining a position of a point of interest of the terrestrial vehicle at a second location different than the first location based on the position signal, the gyro signal, and a positional relationship between the first location and the second location. The position of the point of interest of the terrestrial vehicle can be determined with respect to a surface upon which the terrestrial vehicle is positioned and can be corrected for at least one of the pitch and the roll of the terrestrial vehicle. The method can further include determining a position-based heading direction of the point of interest of the terrestrial vehicle based on the determined position of the point of interest and at least one previously determined position of the point of interest, and determining a calibrated heading direction based on a combination of the gyro-based heading direction and the position-based heading direction. The method can also include outputting a control signal based on the position of the point of interest, the calibrated heading direction, and the desired path. The control signal can be configured to be used to assist with guiding the terrestrial vehicle such that the position of the point of interest is on the desired path.

According to additional aspects of the present disclosure, a navigation system for a terrestrial vehicle is disclosed. The navigation system can include one or more processors and a non-transitory computer-readable storage medium having a plurality of instructions stored thereon, which, when executed by the one or more processors, cause the one or more processors to perform various operations. These operations can include receiving a position signal from a global navigation satellite system (GNSS) antenna mounted at a first location on the terrestrial vehicle. The position signal can be indicative of a spatial position of the GNSS antenna as indicated by the GNSS. The operations can further include receiving a gyro signal from a gyro sensor that is indicative of: (i) at least one of a pitch and a roll of the terrestrial vehicle, and (ii) a gyro-based heading direction. Additionally, the operations can include determining a position of a point of interest of the terrestrial vehicle at a second location different than the first location based on the position signal, the gyro signal, and a positional relationship between the first location and the second location. The position of the point of interest of the terrestrial vehicle can be determined with respect to a surface upon which the terrestrial vehicle is positioned and can be corrected for at least one of the pitch and the roll of the terrestrial vehicle. The operations can further include determining a position-based heading direction of the point of interest of the terrestrial vehicle based on the determined position of the point of interest and at least one previously determined position of the point of interest, and determining a calibrated heading direction based on a combination of the gyro-based heading direction and the position-based heading direction. The operations can also include outputting a control signal based on the position of the point of interest, the calibrated heading direction, and the desired path. The control signal can be configured to be used to assist with guiding the terrestrial vehicle such that the position of the point of interest is on the desired path.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is an overhead schematic view of an example terrestrial vehicle that includes an example navigation system according to some implementations of the present disclosure;

DETAILED DESCRIPTION

Figure 1B:
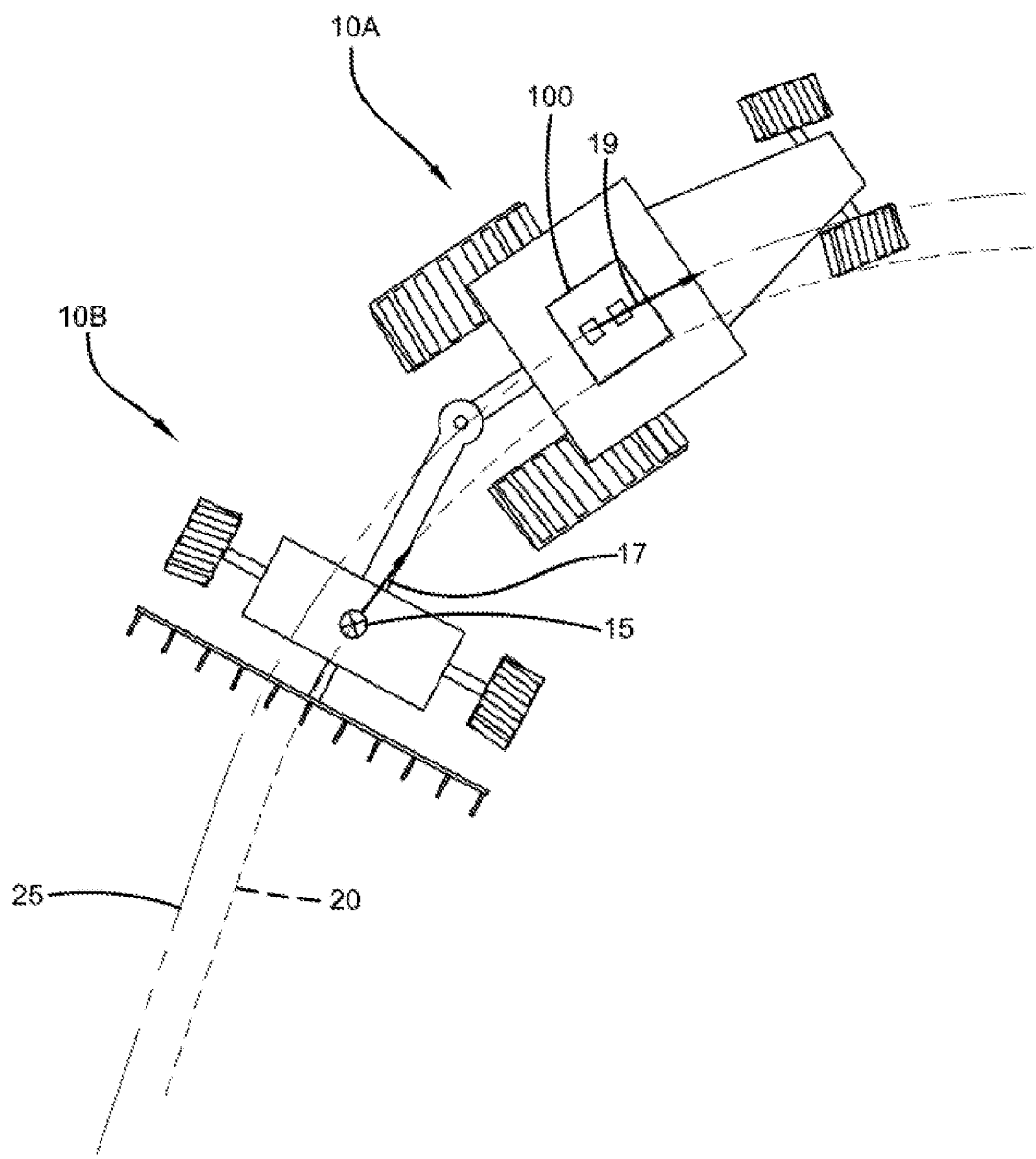
FIG. 1B is an overhead schematic view of the example terrestrial vehicle of FIG. 1A that illustrates the difference between a desired path of a point of interest on the terrestrial vehicle and an actual path of the terrestrial vehicle.

As briefly mentioned above, there remains a need for improved terrestrial vehicle navigation systems and methods. For example only, in some situations a terrestrial vehicle may include a self-propelled portion (such as, a tractor) and a non-propelled portion (such as, a towed implement). In such cases, an operator may wish to guide the non-propelled portion (or a specific location thereof) along a desired path. Typical navigation systems will utilize the location as determined by a GNSS receiver located on the self-propelled portion to guide the vehicle on the desired path. In the event that the receiver location differs from the location of interest to the operator (e.g. the receiver is located apart from the towed implement), the navigation system may lack the desired accuracy and the actual path of travel of the vehicle may differ from the desired path.

In yet another example, the desired path of the terrestrial vehicle may be across uneven and/or sloped terrain, which can result in an error or offset of the actual location of the vehicle (or point of interest thereon) when compared to the sensed location of the GNSS receiver. For example only, an operator of a tractor that includes a towed planter attachment may wish to seed a field at specific locations, such as in rows. The field may be rough and uneven, which causes the tractor to bounce and sway as it travels across the field, causing changes to the pitch and roll of the vehicle. The sensed location of the receiver, due in part to the changes in the pitch and roll of the vehicle, may greatly vary from the actual location of the towed planter attachment. This may be especially true in the common situation in which the receiver is located at an elevated point of the vehicle (e.g., on the roof) and the towed element is proximate or at the ground level. Thus, utilizing the sensed location of the receiver on the tractor may result in a deviation from the desired planting location, resulting in a suboptimal guidance along the desired path.

The present disclosure is directed to systems and methods of terrestrial vehicle navigation that address one or more of the limitations described above. More specifically, the present disclosure is directed to systems and methods for guiding terrestrial vehicles that address any discrepancies between the location of the receiver as sensed and the location of the point of interest on the vehicle, e.g., due to the pitch, roll, and/or other unforeseen factors encountered while travelling along the desired path.

The systems and methods can include utilizing a sensed location of the GNSS receiver, a received gyro signal from one or more gyro sensors attached to the vehicle, and a positional relationship between the receiver location and the location of the point of interest on the vehicle to determine a compensated position of the point of interest. Further, the compensated position as well as past compensated positions can be utilized to determine an actual heading direction of the point of interest. The compensated position, the heading direction, and a desired path can be compared to determine a control signal for the vehicle. The control signal can provide a guidance control signal to an automated steering system and/or to an operator of the vehicle to assist in guiding the vehicle along the desired path.

Referring now to FIGS. 1A and 1B, an example terrestrial vehicle 10 that includes a navigation system 100 according to some implementations of the present disclosure is shown. As mentioned above, the terrestrial vehicle 10 can take any form, but is illustrated as a two part vehicle that includes a tractor 10A that is towing a towable implement 10B. The navigation system 100 can include one or more global navigation satellite system ("GNSS") antennae 110 and one or more gyro sensors 120. As described more fully below, the navigation system 100 can assist with guiding the terrestrial vehicle 10 along a desired path 20.

Figure 2:
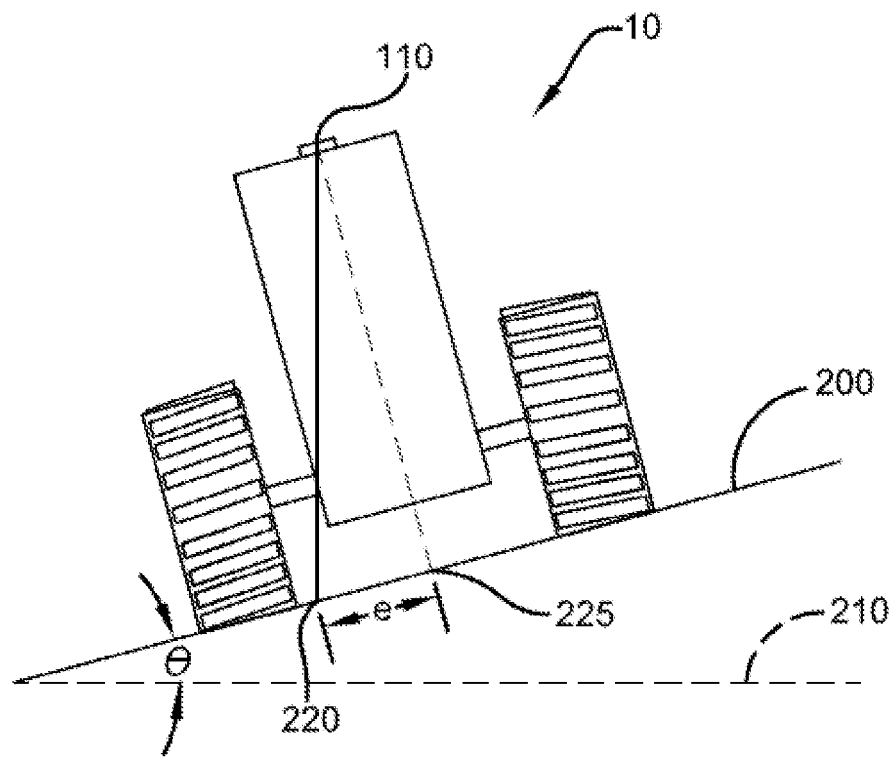
FIG. 2 is a rear schematic view of the example terrestrial vehicle of FIG. 1A illustrating a surface on which the terrestrial vehicle is positioned.

With further reference to FIG. 2, the terrestrial vehicle 10 can travel along a surface 200 such as a dirt path, field, or other form of ground. The surface 200 may be uneven, undulating, and/or in other ways different from a theoretical flat surface 210. In the illustrated example of FIG. 2, the surface 200 is shown as being angled with respect to the theoretical flat surface 210 by an angle $\theta$. Due to the divergence of the actual surface 200 from the theoretical flat surface 210, the sensed position 220 (as sensed by the GNSS sensor 110) will differ from the actual position 225 of the terrestrial vehicle 100 with respect to surface 200 by an error e. In addition to or alternatively, this error can be caused by the pitch and/or roll of the terrestrial vehicle 10 as it travels along the surface 200. For example only, while the terrestrial vehicle 10 is travelling along the surface 200 obstacles (rocks, ruts, etc.) may cause the vehicle 10 to pitch and/or roll, thereby causing the GNSS antenna 110 to sense a position 220 different from the actual position 225. This may be particularly true in the configuration where, as is typical, the GNSS antenna 110 is mounted at an uppermost point of the terrestrial vehicle 10, such as on the roof of a tractor 10A.

Furthermore, in addition to the deviation of the sensed position 220 from the actual position 225, e.g., due to surface irregularities, the sensed position 220 is related to the location of the GNSS antenna 110 and not an actual point of interest of the terrestrial vehicle 10. For example only, an operator may intend to guide a point of interest 15 (such as a planter that plants seeds) of the vehicle 10 along a desired path 20 (such as a row in an agricultural field). In the event that the GNSS antenna 110 is located at a first location (e.g., on the tractor 10A) and the point of interest 15 is located at a second location (e.g., on the towed implement 10B) different from the first location, there may be an error between the desired path 20 and the actual path of the vehicle 10. In the event that the navigation system 100 utilizes the sensed position 220 to guide the terrestrial vehicle 100, it is probable that the position of the point of interest 15 would not travel along the desired path 20, e.g., the heading direction 17 of the point of interest 15 will deviate from the desired path 20. For example only, and with reference to FIG. 1B, in order for the point of interest 15 to travel along the desired path 20, it may be the case that the terrestrial vehicle 10 (e.g., the GNSS antenna 110) will need to travel along a different path 25 and the heading direction 17 of the point of interest 15 will differ from the heading direction 19 of the terrestrial vehicle 10 (e.g., the GNSS antenna 110).

Figure 3:
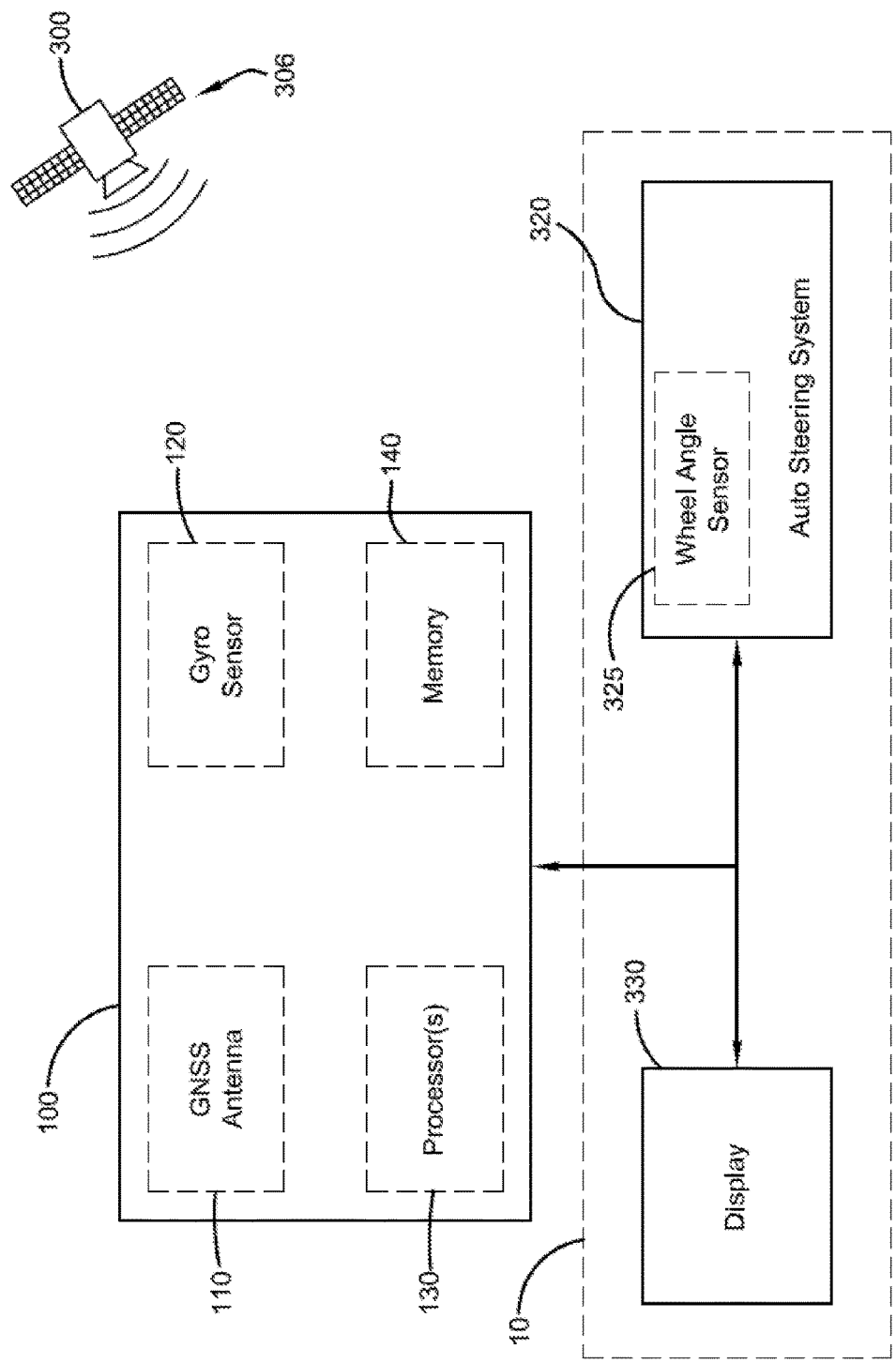
FIG. 3 is a functional block diagram of the example terrestrial vehicle and navigation system of FIG. 1A.

In order to provide an improved navigation system and method, the present disclosure describes the fusion of the functionality of a GNSS sensor 110 and a gyro sensor 120 into an integrated navigation system 100 that can be utilized to determine a position and/or heading of a point of interest 15 on a terrestrial vehicle 10. With reference to FIG. 3, an example of the navigation system 100 can include at least one GNSS antenna 110, one or more gyro sensors 120, one or more processors 130, and a memory 140. The navigation system 100 can be utilized with a terrestrial vehicle 10, such as the examples described above.

The GNSS antenna 110 can comprise a single GNSS receiver that is configured to receive signals 306 from a plurality of satellites 300. Based on the signals 306, the GNSS antenna 110 can output a position signal that is indicative of the spatial position of the GNSS antenna 110. Alternatively, the GNSS antenna 110 can comprise a plurality of GNSS receivers in a multi-antenna GNSS antenna system. In such a multi-antenna GNSS antenna system, not only can the GNSS antenna 110 determine a spatial position and output a position signal, it also may be possible to determine a heading direction and/or orientation (pitch, roll, etc.). It should be appreciated that the present disclosure can be equally applicable, mutatis mutandis, to either a single- or multi-antenna GNSS system.

The gyro sensor(s) 120 can be mounted on or otherwise arranged to sense various aspects of the terrestrial vehicle 10. In general, the gyro sensor(s) 120 can output a gyro signal that is indicative of a pitch, a roll, and/or a gyro-based heading direction (yaw) of the terrestrial vehicle 10. In one implementation, the gyro sensor(s) 120 can output a gyro signal that is indicative of: (i) at least one of a pitch and a roll of the terrestrial vehicle 10, and (ii) a gyro-based heading direction.

In some aspects, the gyro sensor 120 can include a pitch gyro, a roll gyro, a yaw gyro and a plurality of accelerometers. The pitch gyro can determine and output a signal that is indicative of the pitch of the terrestrial vehicle 10. Similarly, the roll gyro can determine and output a signal that is indicative of the roll of the terrestrial vehicle 10, and the yaw gyro can determine and output a signal that is indicative of the yaw of the terrestrial vehicle 10.

For each of the pitch, roll, and yaw gyros, one or more accelerometers may be utilized to calibrate the raw signal output by the gyro. For example only, the pitch and roll gyros may be calibrated with one or more accelerometer signals to determine an absolute value for each of the pitch and roll of the terrestrial vehicle 10. In some implementations, however, the yaw gyro will output a signal indicative of a change in the yaw of the vehicle 10. In such implementations, the output of the yaw gyro cannot be calibrated with an accelerometer to determine an absolute value of the yaw of the terrestrial vehicle 10, but instead can be calibrated to determine a more accurate change in yaw of the vehicle 10, which can be combined with a previous determined heading direction, as further described below.

The processor 130 can be any form of circuitry that is programmed to perform operations. For example only, the processor 130 can be configured to execute instructions that cause the processor 130 to perform various operations of the navigation methods described herein. The term "processor" as used herein can refer to both a single processor and a plurality of processors operating in a parallel or distributed architecture. The processor 130 can also be configured to control operation of the navigation system 100, including executing/loading an operating system and accessing or operating the memory 140. The processor 130 can also be configured to perform at least a portion of the operations of the present disclosure, which are discussed in greater detail below.

The memory 140 can be any suitable storage medium (flash, hard disk, etc.) that is configured to store information. In some implementations, the memory 140 can take the form of a non-transitory computer-readable storage medium having a plurality of instructions stored thereon. These instructions, when executed by the processor 130, can cause the processor to perform one or more operations of the navigation techniques described herein.

In some aspects, the navigation system 100 can be coupled to or otherwise be in communication with additional components of the terrestrial vehicle 10. For example only, and as shown in FIG. 3, the navigation system 100 can be in communication with an automatic steering system 320 that can be utilized to guide the terrestrial vehicle 10. In the illustrated example, the automatic steering system 320 includes a wheel angle sensor 325 associated with one or more steering wheels of the vehicle 10. Alternatively or additionally, the navigation system 100 can be in communication with a display 330 in the terrestrial vehicle 10. The display 330 can, for example, output a user interface to a driver of the terrestrial vehicle 10. The user interface (not shown) can assist the driver to guide the terrestrial vehicle 10 along the desired path, e.g., by outputting a series of commands (veer right, veer left, turn, etc.) to the user.

As mentioned above, there may be a difference or error between the spatial position as sensed by the GNSS antenna 110 and the actual position of a point of interest 15 on the terrestrial vehicle 10. In some aspects, the navigation system 100 can compensate or correct for this difference and determine the actual position of the point of interest 15. For example only, the memory 140 can store a positional relationship between the location (a "first location") of the GNSS antenna 110 and the location (a "second location") of the point of interest 15. The positional relationship can comprise information relating to the offset (e.g., the direction and distance) between the location of GNSS antenna 110 and the point of interest 15.

In some implementations, the positional relationship between the location of GNSS antenna 110 and the point of interest 15 may not be constant, but instead may vary while the terrestrial vehicle 10 moves. For example only, if the point of interest 15 is located on an implement that is being towed (such as towable implement 10b), the positional relationship between the GNSS antenna 110 and the point of interest 15 may vary as the towed implement pivots or moves in relation to the GNSS antenna 110 (such as during turns). In order to address this variation in the positional relationship, the navigation system 100 can further include an additional sensor 115 associated with the point of interest 15. The sensor 115 can generate an offset signal that is indicative of the positional relationship between the GNSS antenna 110 and the point of interest 15. Example of the sensor 115 include, but are not limited to, an additional GNSS sensor located at the point of interest 15, a tracking sensor (such as Lidar at the location of the GNSS antenna 110 and a reflector at the point of interest 15) capable of determining the offset (distance and angle), a radar sensor, and a radio sensor.

Based on the positional relationship, as well as the position signal output from the GNSS antenna 110 and the gyro signal output by the gyro sensor 120, the navigation system 100 can determine the actual spatial position of the point of interest 15 on the terrestrial vehicle 10. The actual position of the point of interest 15 can be determined with respect to the surface 200 upon which the terrestrial vehicle 10 is positioned and corrected for the pitch and/or roll of the vehicle 10. In this manner, the actual position of the point of interest 15 can be compared to the desired path 20 in order to assist in guiding the terrestrial vehicle 10.

As mentioned above, the gyro sensor 120 can output a gyro signal that is indicative of a gyro-based heading direction. Typically, such a gyro-based heading direction is indicative of a change in the heading direction of the terrestrial vehicle 10, as opposed to an absolute heading direction. Thus, in the absence of an initial, absolute heading direction, a gyro-based heading direction that indicates changes in the heading may be ineffectual to provide a usable heading direction for guiding the vehicle 10.

Furthermore, in some implementations, the GNSS antenna 110 can provide a GNSS-based heading direction that indicates the heading direction as sensed by the GNSS antenna 110. Such a GNSS-based heading direction, however, may have limited utility to the navigation system 110, as the GNSS-based heading direction is related to the heading direction of the GNSS antenna 110 and not the point of interest 15. Furthermore, the GNSS antenna 110 may be particularly susceptible to errors in the determination of the GNSS-based heading direction due to the pitch/roll of the vehicle 10, especially at slow speeds and/or implementations where the GNSS antenna 110 is located at an uppermost point of the vehicle 10 (e.g., on the roof) that experiences the most sway/wobble.

In order to address the above issues, in some aspects, the navigation system 100 can also determine a position-based heading direction of the point of interest 15. The position-based heading direction can be determined by the navigation system 100 based on the determined position and at least one previously determined position of the point of interest 15. In some aspects, the navigation system 100 fits a line or curve to the plurality of spatial points corresponding to the current position and one or more previous positions of the point of interest 15 (e.g., by a curve fitting algorithm). The curve can then be extended to predict the position-based heading direction of the terrestrial vehicle 10.

In order to obtain a more accurate heading direction for the terrestrial vehicle 10, the navigation system 100 can further determine a calibrated heading direction based on the combination of the gyro-based heading direction and the position-based heading direction. For example only, the determined position-based heading direction (which provides an absolute heading direction) can be calibrated by the gyro-based heading direction (which provides an indication of a change in heading direction) to provide a potentially more accurate heading direction for the terrestrial vehicle 10. This potentially more accurate heading direction shall be referred to herein as the calibrated heading direction and can be utilized by the navigation system 100, as more fully discussed below.

The navigation system 100 can further determine and output a control signal based on the position of the point of interest, the calibrated heading direction, and the desired path 20. The control signal can be configured to be used to assist with guiding the terrestrial vehicle 10 along the desired path 20 such that the actual position of the point of interest 15 is on the desired path 20. In this manner, the navigation system 100 can provide accurate guidance for the terrestrial vehicle 10 and, potentially of particular importance, the point of interest 15.

In some implementations, the navigation system 100 can output the control signal to the automatic steering system 320 that guides the terrestrial vehicle 10 along the desired path 20. In some such implementations, the navigation system 100 can also receive a wheel angle signal from a wheel angle sensor 325 associated with one or more steering wheels of the terrestrial vehicle 10. The wheel angle signal can be indicative of an angle of the one or more steering wheels, as sensed by the wheel angle sensor 325. The navigation system 100 can further, in various aspects, determine the control signal based not only on the position of the point of interest 15, the calibrated heading direction, and the desired path 20, but also the wheel angle signal.

Additionally, the navigation system 100 may also determine a calibrated angle of the one or more steering wheels based on the received wheel angle signal and the calibrated heading direction. As the terrestrial vehicle 10 travels along the desired path 20, the navigation system 100 may determine that the vehicle is deviating from the path in a manner that is not expected based on the wheel angle signal. In this manner, the navigation system 100 can determine an error or offset of the angle of the steering wheel(s) and compensate (or calibrate) the wheel angle signal. In such implementations, the control signal can be based on the position of the point of interest 15, the calibrated heading direction, the desired path 20, and the calibrated angle (as opposed to the raw wheel angle signal).

In other or additional embodiments, the control signal can be output to a display 330 in the terrestrial vehicle 10 to assist a driver (not shown) to guide the terrestrial vehicle 10 along the desired path 20. As mentioned above, the display 330 can, for example, output a user interface to the driver of the terrestrial vehicle 10. The user interface (not shown) can assist the driver to guide the terrestrial vehicle 10 along the desired path, e.g., by outputting a series of commands (veer right, veer left, turn, etc.) to the user. It should be appreciated that the user interface can take any form that assists the driver in guiding the terrestrial vehicle 10.

As mentioned above, in some implementations the navigation system 100 can include a multi-antenna GNSS antenna system 110 that can determine a GNSS-based heading direction. In such implementations, the navigation system 100 can utilize the GNSS-based heading direction to calibrate the gyro-based heading direction received from the gyro sensor 120. For example only, when the terrestrial vehicle 10 is first initialized and has not yet begun moving, it may not be possible to determine a position-based heading direction as there is no previously determined position of the point of interest 15. If, however, the vehicle 10 includes a multi-antenna GNSS antenna system 110, an initial GNSS-based heading direction can be determined. The initial GNSS-based heading direction can be utilized to calibrate the gyro-based heading direction, which, as mentioned above, may only be indicative of changes in the heading direction (yaw) of the vehicle 10.

In further implementations, it may be desirable to further integrate the calibrated heading direction (as determined by the navigation system 100) to calibrate, correct or otherwise improve upon the performance of the gyro sensor 120. For example only, and as mentioned above, the navigation system 100 can determine a position-based heading direction of the point of interest 15 of the vehicle 10 based on the current and previous positions of the point of interest 15. Further, the gyro-based heading direction can also be combined or otherwise utilized to calibrate the position-based heading direction to determine a calibrated heading direction of the point of interest 15. In these implementations, the calibrated heading direction can then be utilized to calibrate the gyro-based heading direction to obtain a calibrated gyro-based heading direction. In this manner, the navigation system 100 can recursively optimize its determinations of the position and/or heading direction of the point of interest 15.

As an example, the determination of the position of the point of interest 15 of the vehicle 10 can be based on the position signal (from the GNSS antenna 110), the positional relationship between the positions of the GNSS antenna 110 and the point of interest 15, and the calibrated gyro-based heading direction (as opposed to the raw gyro-based heading direction determined from the gyro signal). It should be appreciated that, in implementations where the positional relationship can vary (such as those in which the point of interest 15 is located on a towed implement), the determination of the position of the point of interest 15 can further be based on an offset signal received from a sensor 115 associated with the point of interest 15, as described above. This feedback process can provide a more accurate determination of the position and heading direction of the point of interest 15.

It is possible that the terrestrial vehicle 10 may start and stop moving as the vehicle travels along the desired path 20. When the vehicle 10 stops moving, it should be appreciated that the actual heading direction of the vehicle 10 will not change as the terrestrial vehicle 10 may be incapable of rotating on the surface 200 without moving. Due to various factors (sensor drift, vibration due to engine idle, etc.), however, the position signal and/or the GNSS-based heading direction from the GNSS antenna 110 and/or the gyro signal from the gyro sensor 120 may indicate erroneous heading directions of the terrestrial vehicle 10.

In order to address these errors, the navigation system 100 may "lock" or otherwise keep the previously determined heading direction as the current heading direction notwithstanding any signals from the GNSS antenna 110 and/or gyro sensor 120. For example only, when the terrestrial vehicle 10 stops at a stop time, the navigation system 100 can store the gyro-based heading direction at the stop time as a stored gyro-based heading direction. Then, when the terrestrial vehicle 10 begins moving again at a start time after the stop time, the navigation system 100 can initialize the gyro-based heading direction as the stored gyro-based heading direction. In this manner, the navigation system 100 can compensate for the drift in the gyro sensor 120. In another example, the navigation system 100 can also or alternatively ignore changes in the position signal and/or GNSS-based heading direction from the GNSS antenna 110 while the vehicle 10 is not moving (e.g., when vehicle speed is zero). In this manner, the position-based heading direction will remain constant while the vehicle 10 is stopped. This may also provide the further advantage of eliminating the need for an expensive (computationally or otherwise) filter to remove noise (such as vibration) from the position signal and GNSS-based heading direction signal.

The navigation system 100 can also, according to some aspects, determine a distance travelled and/or ground speed of the terrestrial vehicle 10 based on the determined positions described above. For example only, the navigation system 100 can store a plurality of determined positions of the point of interest 15, e.g., in the memory 140. Each of the determined positions may have associated therewith a time stamp or other information that is indicative of an elapsed time between the various positions. The navigation system 100 can determine a distance traveled by calculating the distance between the determined positions. In order to calculate the ground speed, e.g., the navigation system 100 can divide the distance traveled by the elapsed time. It should be appreciated that the navigation system 100 can utilize any time period to calculate an accurate ground speed of the vehicle 10, e.g., the navigation system 100 could determine a "current" ground speed of the vehicle 10 by utilizing two or more recently determined positions, and/or an "average" ground speed over a given time period.

Figure 4:
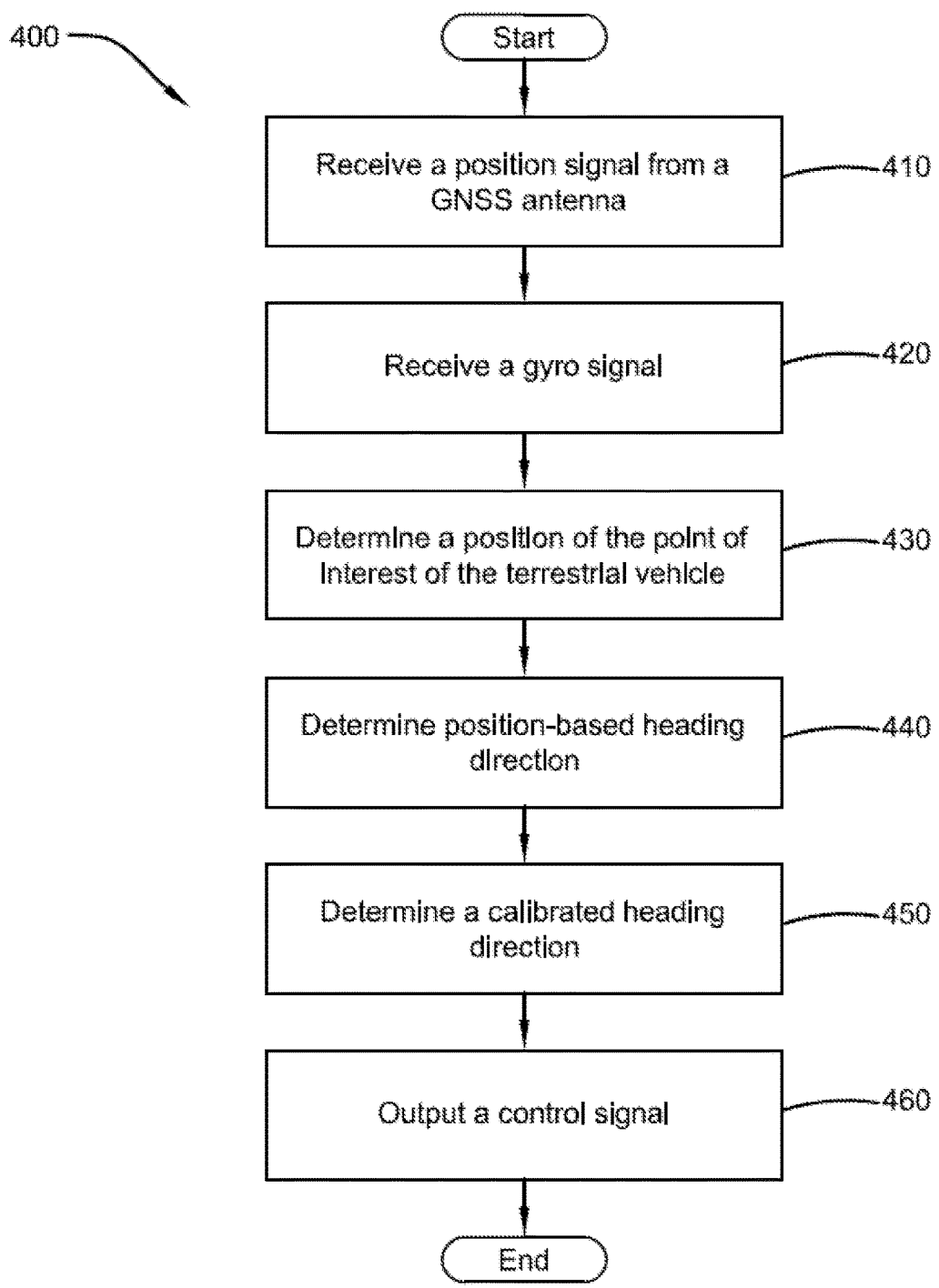
FIG. 4 is a flow diagram of an example method for guiding a terrestrial vehicle along a desired path according to some implementations of the present disclosure.

A flow chart detailing an example method 400 for guiding a terrestrial vehicle 10 along a desired path 20 is illustrated in FIG. 4. The method 400 will be described in the context of the terrestrial vehicle 10 and the navigation system 100 described above. At 410, the navigation system 100 can receive a position signal from a global navigation satellite system (GNSS) antenna 110 mounted at a first location on the terrestrial vehicle 10. As mentioned above, the position signal can be indicative of a spatial position of the GNSS antenna 110 as indicated by the GNSS (e.g., via satellite(s) 300). Further, the navigation system 100 can receive a gyro signal from a gyro sensor 120 that is indicative of: (i) at least one of a pitch and a roll of the terrestrial vehicle 10, and (ii) a gyro-based heading direction at 420.

The navigation system 100 can also store (e.g., in memory 140) a positional relationship between the location of the GNSS antenna 110 and a point of interest 15 on the terrestrial vehicle 10. At 430, the navigation system 100 can determine a position of the point of interest 15 of the terrestrial vehicle 10 at a second location different than the first location based on the position signal, the gyro signal, and the positional relationship between the first location and the second location. The position of the point of interest 15 of the terrestrial vehicle 10 can be determined with respect to a surface 200 upon which the terrestrial vehicle 10 is positioned and corrected for at least one of the pitch and the roll of the terrestrial vehicle 10.

Furthermore, the navigation system 100 can determine a position-based heading direction of the point of interest 15 of the terrestrial vehicle 10 based on the determined position and at least one previously determined position of the point of interest 15 (at 440). Based on a combination of the gyro-based heading direction and the position-based heading direction, at 450 the navigation system 100 can determine a calibrated heading direction. At 460, the navigation system 100 can output a control signal based on the position of the point of interest 15, the calibrated heading direction, and the desired path 20. The control signal can be configured to be used to assist with guiding the terrestrial vehicle 10 such that the position of the point of interest 15 is on the desired path 20. As described above, the control signal can be output, e.g., to an automatic steering system 320 or a display 330 in the terrestrial vehicle 10. The method 400 can end or return to 410.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), field programmable gate arrays (FPGAs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for guiding a terrestrial vehicle along a desired path, comprising:
   receiving a position signal from a global navigation satellite system (GNSS) antenna mounted at a first location on the terrestrial vehicle, the position signal being indicative of a spatial position of the GNSS antenna as indicated by the GNSS;
   receiving a gyro signal from a gyro sensor, the gyro signal being indicative of: (i) at least one of a pitch and a roll of the terrestrial vehicle, and (ii) a gyro-based heading direction;
   determining a position of a point of interest of the terrestrial vehicle at a second location different than the first location based on the position signal, the gyro signal, and a positional relationship between the first location and the second location, the position of the point of interest of the terrestrial vehicle being determined with respect to a surface upon which the terrestrial vehicle is positioned and corrected for at least one of the pitch and the roll of the terrestrial vehicle;
   determining a position-based heading direction of the point of interest of the terrestrial vehicle based on the determined position of the point of interest and at least one previously determined position of the point of interest;

determining a calibrated heading direction based on a combination of the gyro-based heading direction and the position-based heading direction; and outputting a control signal based on the position of the point of interest, the calibrated heading direction, and the desired path, the control signal configured to be used to assist with guiding the terrestrial vehicle such that the position of the point of interest is on the desired path.

2. The method of claim 1, wherein the control signal is output to an automatic steering system that guides the terrestrial vehicle along the desired path.

3. The method of claim 2, further comprising:
receiving a wheel angle signal from a wheel angle sensor associated with one or more steering wheels of the terrestrial vehicle, the wheel angle signal being indicative of an angle of the one or more steering wheels,
wherein the control signal is further based on the wheel angle signal.

4. The method of claim 3, further comprising:
determining a calibrated angle of the one or more steering wheels based on the received wheel angle signal and the calibrated heading direction,
wherein the control signal being further based on the wheel angle signal comprises the control signal being further based on the calibrated angle.

5. The method of claim 1, further comprising receiving an offset signal from a sensor associated with the point of interest, the offset signal being indicative of the positional relationship between the between the first location and the second location, wherein determining the position of the point of interest of the terrestrial vehicle is further based on the offset signal.

6. The method of claim 1, wherein the gyro sensor comprises a roll gyro, a pitch gyro, a yaw gyro, and a plurality of accelerometers, wherein the plurality of accelerometers are utilized to calibrate the roll gyro and the pitch gyro such that the gyro signal is indicative of the pitch and the roll of the terrestrial vehicle.

7. The method of claim 6, wherein:
the GNSS antenna comprises a multi-antenna GNSS antenna system that determines an initial GNSS-based heading direction, and
the method further comprises, when the terrestrial vehicle begins moving at an initial time, calibrating the gyro-based heading direction indicated by the yaw gyro based on the initial GNSS-based heading direction.

8. The method of claim 1, further comprising calibrating the gyro-based heading direction based on the calibrated heading direction to obtain a calibrated gyro-based heading direction, wherein determining the position of the point of interest based on the position signal, the gyro signal, and the positional relationship between the first location and the second location comprises determining the position of the point of interest based on the position signal, the calibrated gyro-based heading direction, and the positional relationship between the first location and the second location.

9. The method of claim 1, further comprising:
when the terrestrial vehicle stops at a stop time, storing the gyro-based heading direction at the stop time as a stored gyro-based heading direction; and
when the terrestrial vehicle begins moving again at a start time after the stop time, initializing the gyro-based heading direction as the stored gyro-based heading direction to compensate for drift of the gyro sensor.

10. The method of claim 1, further comprising determining a ground speed of the point of interest based on a plurality of determined positions of the point of interest of the terrestrial vehicle.

11. A navigation system for a terrestrial vehicle, comprising:
one or more processors; and
a non-transitory computer-readable storage medium having a plurality of instructions stored thereon, which, when executed by the one or more processors, cause the one or more processors to perform operations comprising:
receiving a position signal from a global navigation satellite system (GNSS) antenna mounted at a first location on the terrestrial vehicle, the position signal being indicative of a spatial position of the GNSS antenna as indicated by the GNSS;
receiving a gyro signal from a gyro sensor, the gyro signal being indicative of: (i) at least one of a pitch and a roll of the terrestrial vehicle, and (ii) a gyro-based heading direction;
determining a position of a point of interest of the terrestrial vehicle at a second location different than the first location based on the position signal, the gyro signal, and a positional relationship between the first location and the second location, the position of the point of interest of the terrestrial vehicle being determined with respect to a surface upon which the terrestrial vehicle is positioned and corrected for at least one of the pitch and the roll of the terrestrial vehicle;
determining a position-based heading direction of the point of interest of the terrestrial vehicle based on the determined position of the point of interest and at least one previously determined position of the point of interest;
determining a calibrated heading direction based on a combination of the gyro-based heading direction and the position-based heading direction; and
outputting a control signal based on the position of the point of interest, the calibrated heading direction, and the desired path, the control signal configured to be used to assist with guiding the terrestrial vehicle such that the position of the point of interest is on the desired path.

12. The navigation system of claim 11, wherein the control signal is output to an automatic steering system that guides the terrestrial vehicle along the desired path.

13. The navigation system of claim 12, wherein the operations further comprise:
receiving a wheel angle signal from a wheel angle sensor associated with one or more steering wheels of the terrestrial vehicle, the wheel angle signal being indicative of an angle of the one or more steering wheels,
wherein the control signal is further based on the wheel angle signal.

14. The navigation system of claim 13, wherein the operations further comprise:
determining a calibrated angle of the one or more steering wheels based on the received wheel angle signal and the calibrated heading direction,
wherein the control signal being further based on the wheel angle signal comprises the control signal being further based on the calibrated angle.

15. The navigation system of claim 11, wherein the operations further comprise receiving an offset signal from a sensor associated with the point of interest, the offset signal being indicative of the positional relationship between the between the first location and the second location, wherein determining the position of the point of interest of the terrestrial vehicle is further based on the offset signal.

16. The navigation system of claim 11, wherein the gyro sensor comprises a roll gyro, a pitch gyro, a yaw gyro, and a plurality of accelerometers, wherein the plurality of accelerometers are utilized to calibrate the roll gyro and the pitch gyro such that the gyro signal is indicative of the pitch and the roll of the terrestrial vehicle.

17. The navigation system of claim 16, wherein:
the GNSS antenna comprises a multi-antenna GNSS antenna system that determines an initial GNSS-based heading direction, and
the operations further comprise, when the terrestrial vehicle begins moving at an initial time, calibrating the gyro-based heading direction indicated by the yaw gyro based on the initial GNSS-based heading direction.

18. The navigation system of claim 11, wherein the operations further comprise calibrating the gyro-based heading direction based on the calibrated heading direction to obtain a calibrated gyro-based heading direction, wherein determining the position of the point of interest based on the position signal, the gyro signal, and the positional relationship between the first location and the second location comprises determining the position of the point of interest based on the position signal, the calibrated gyro-based heading direction, and the positional relationship between the first location and the second location.

19. The navigation system of claim 11, wherein the operations further comprise:
when the terrestrial vehicle stops at a stop time, storing the gyro-based heading direction at the stop time as a stored gyro-based heading direction; and
when the terrestrial vehicle begins moving again at a start time after the stop time, initializing the gyro-based heading direction as the stored gyro-based heading direction to compensate for drift of the gyro sensor.

20. The navigation system of claim 11, wherein the operations further comprise determining a ground speed of the point of interest based on a plurality of determined positions of the point of interest of the terrestrial vehicle.

* * * * *